United States Patent
Palermo et al.

(10) Patent No.: US 10,048,977 B2
(45) Date of Patent: Aug. 14, 2018

(54) METHODS AND APPARATUS FOR MULTI-STAGE VM VIRTUAL NETWORK FUNCTION AND VIRTUAL SERVICE FUNCTION CHAIN ACCELERATION FOR NFV AND NEEDS-BASED HARDWARE ACCELERATION

(71) Applicant: Intel Corporation, Santa Clara, CA (US)

(72) Inventors: Stephen T. Palermo, Chandler, AZ (US); Thomas E. Willis, Redwood City, CA (US); Kapil Sood, Beaverton, OR (US); Ilango S. Ganga, Cupertino, CA (US); Scott P. Dubal, Beaverton, OR (US); Pradeepsunder Ganesh, Chandler, AZ (US); Jesse C. Brandeburg, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 170 days.

(21) Appl. No.: 14/978,569

(22) Filed: Dec. 22, 2015

(65) Prior Publication Data

US 2017/0177396 A1    Jun. 22, 2017

(51) Int. Cl.
*G06F 9/455* (2018.01)
*H04L 12/931* (2013.01)

(52) U.S. Cl.
CPC .......... *G06F 9/45558* (2013.01); *H04L 49/70* (2013.01); *G06F 2009/45595* (2013.01)

(58) Field of Classification Search
None
See application file for complete search history.

(56) References Cited

U.S. PATENT DOCUMENTS

| | | |
|---|---|---|
| 2014/0198653 A1 | 7/2014 | Dalal et al. |
| 2014/0281056 A1 | 9/2014 | Davda et al. |
| 2015/0178243 A1 | 6/2015 | Lowery et al. |

(Continued)

FOREIGN PATENT DOCUMENTS

WO    2017/112143 A1    6/2017

OTHER PUBLICATIONS

Jardin et al., "NFV with OpenStack", Red Hat, Oct. 2014, pp. 1-38.

(Continued)

*Primary Examiner* — Diem Cao
(74) *Attorney, Agent, or Firm* — Law Office of R. Alan Burnett, P.S.

(57) ABSTRACT

Methods and Apparatus for Multi-Stage VM Virtual Network Function and Virtual Service Function Chain Acceleration for NFV and needs-based hardware acceleration. Compute platform hosting virtualized environments including virtual machines (VMs) running service applications performing network function virtualization (NFV) employ Field Programmable Gate Array (FPGA) to provide a hardware-based fast path for performing VM-to-VM and NFV-to-NFV transfers. The FPGAs, along with associated configuration data are also configured to support dynamic assignment and performance of hardware-acceleration to offload processing tasks from processors in virtualized environments, such as cloud data centers and the like.

25 Claims, 9 Drawing Sheets

(56) References Cited

U.S. PATENT DOCUMENTS

| | | | | |
|---|---|---|---|---|
| 2015/0365324 A1* | 12/2015 | Kumar | ................ | H04L 12/4641 |
| | | | | 370/392 |
| 2015/0372840 A1* | 12/2015 | Benny | ................ | H04L 12/4641 |
| | | | | 370/409 |
| 2017/0019303 A1* | 1/2017 | Swamy | ................ | H04L 41/5041 |
| 2017/0126435 A1* | 5/2017 | Benny | ................ | H04L 12/4675 |

OTHER PUBLICATIONS

International Search Report and Written Opinion received for PCT Patent Application No. PCT/US2016/062209, dated Feb. 17, 2017, 11 pages.

Unnikrishnan et al., "Scalable Network Virtualization Using FPGAs", FPGA'10, Feb. 21-23, 2010, 10 pages.

* cited by examiner

METHODS AND APPARATUS FOR MULTI-STAGE VM VIRTUAL NETWORK FUNCTION AND VIRTUAL SERVICE FUNCTION CHAIN ACCELERATION FOR NFV AND NEEDS-BASED HARDWARE ACCELERATION

BACKGROUND INFORMATION

In virtualized environments virtual switches or bridges are used for forwarding traffic between virtual machines (VMs) and VM to physical networks through network interface cards (NICs). Virtual switch and virtual bridge implementations vary (e.g., software hypervisor implementations, hardware as a virtual embedded switch in a NIC as well as virtual switch acceleration in a NIC to assist the software switch or bridge). VMs are connected to virtual switches using a virtual NIC (vNIC) implemented in either hypervisor software or provided by hardware in physical NICs.

Network Interface controllers that provide hardware virtualization of network interfaces mostly use single root I/O (Input/Output) virtualization (SR-IOV) technology to provide multiple logical network interfaces to share one physical network interface (NIC) card. A physical function (PF) driver running in the host OS is used to configure the NIC hardware.

One or more PCIe (Peripheral Component Interconnect Express) Virtual Functions (VFs) are associated with the NIC which are attached to the NIC's PF. Each VF shares one or more physical resources of the NIC (e.g., memory and a network port) with the PF and other VFs supported on the device. Network traffic is kept separate using an I/O memory management unit (IOMMU) to direct different data streams to and from VFs that are ultimately tied to different VMs. SR-IOV therefore enables traffic to bypass switches implemented by software (i.e., vSwitch). This allows network traffic to flow directly from the NIC VF to a particular VM without the extra burden imposed by software switching.

Service Function Chaining (SFC) provides the ability to define an ordered list of network services (e.g., data compression, security, inspection, firewalls, load balancers). These services are typically implemented as Service Functions (SF) deployed in separate VMs because different services require different applications sometimes running on different operating systems. A SFC is "stitched" together in the network to create a chain of operations that perform processing on a data stream or individual packet. Multiple Service functions in a service path collocated on the same platform can use this invention to forward traffic between the SFs in the chain.

Current software or hardware approaches for VM-to-VM forwarding are sufficient for traditional enterprise or cloud computing environments where direct NIC-to-VM hardware access is a common usage. However for emerging software defined network (SDN) virtualization usage models in enterprise, cloud and Telco networks, VM-to-VM (or, VNF-to-VNF, or VM-to-VNF) access is also significant because certain virtual network functions (VNFs) (e.g., proxy, firewall, router) require multi-stage packet processing typically handled by different applications sometimes on different operating systems handled by different VMs.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
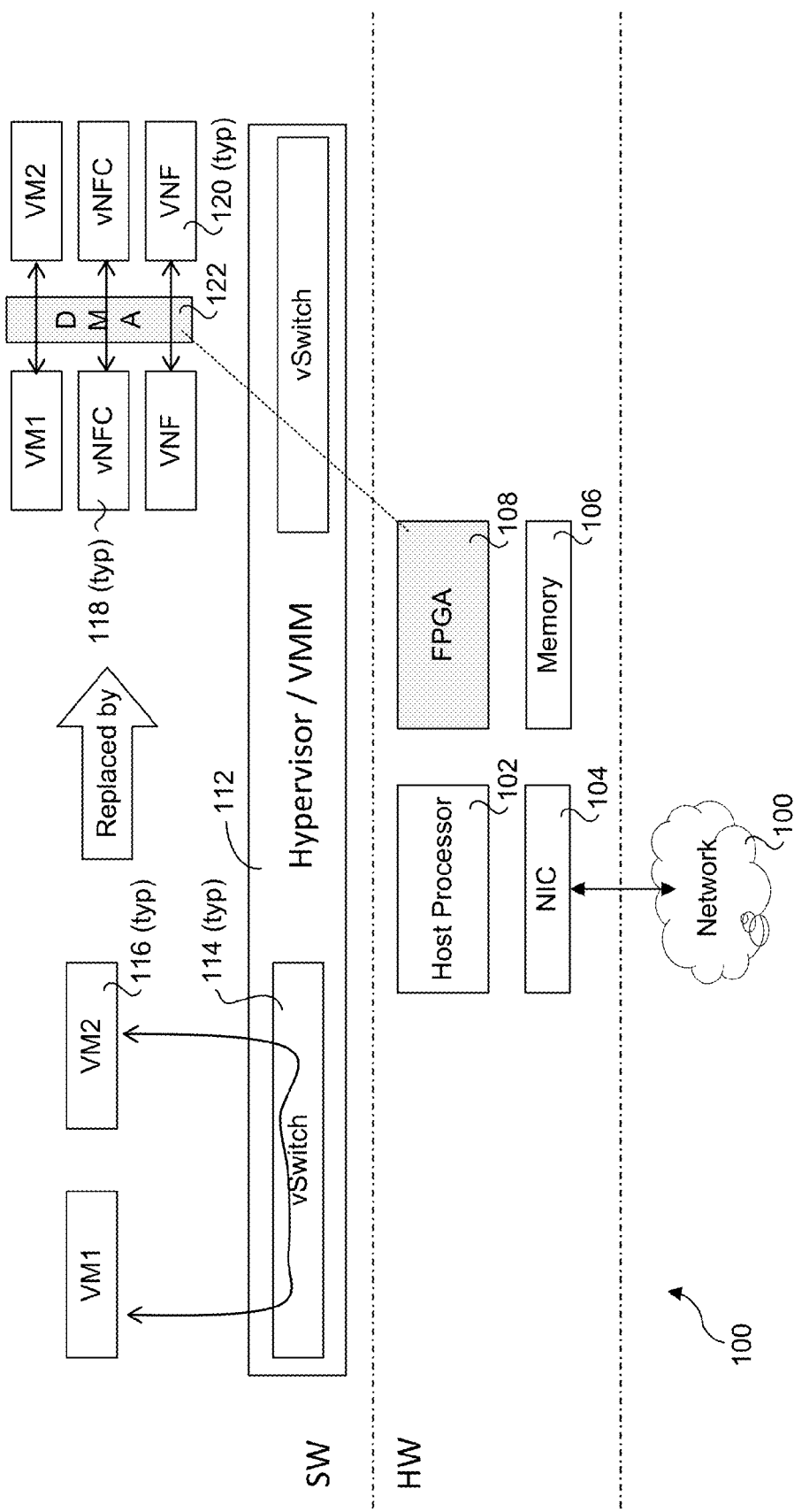
FIG. 1 is a schematic diagram illustrating a comparison between a conventional VM-to-VM communication path that traverses a vSwitch, and a reduced latency using a hardware-based fast path, according to one embodiment.

Embodiments of methods and apparatus for Multi-Stage VM Virtual Network Function and Virtual Service Function Chain Acceleration for NFV and needs-based hardware acceleration are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiments disclose herein, techniques are provided for reducing the latency of network communication between VMs or virtual functions (VFs) that are handling services that span across multiple VMs and/or VFs on the same platform. The embodiments also provide a method of identifying and processing latency-sensitive operations that would not otherwise be possible without the assistance of hardware-based assistance and acceleration that involve the use and involvement of multiple VMs or VFs.

FIG. 1 illustrates a comparison between a conventional VM-to-VM communication path, and the reduced latency facilitated by one embodiment of a platform architecture 100. The platform architecture has a hardware (HW) layer including a host processor 102, a NIC 104, memory 106, and a Field-Programmable Gate Array (FPGA) 108. NIC 104 is depicted as coupled to a Network 110, and is configured to receive and transmit packetized data. The software (SW) components of architecture 100 includes a hypervisor or VMM (Virtual Machine Manager) 112 including one or more virtual switches 114, multiple VMs 116 including VM1 and VM2, virtual network function components (VN-FCs) 118, and VNFs 120. Platform architecture 100 also depicts an FPGA Direct Memory Access (DMA) engine 122 that is depicted at the SW layer for point of illustration, but actually corresponds to functionality that is implemented in the HW layer.

Under the conventional approach depicted on the left, a communication between VM1 and VM2 is forwarded via a vSwitch 114. In contrast, as depicted toward the right, communications between VMs 116, VNFCs 118, and VNFs 120, are directly passed between memory buffers in memory 106 via DMA operations facilitated by programmed logic in FPGA 108 and FPGA DMA engine 122.

The multi-stage Service Function Chaining (SFC) method isolates particular packet processing services (e.g., decryption, de-compression, packet inspection) into separate VMs that may run services (applications or apps) on different guest operating systems (OSs) from different vendors. For an operator VNF environment, a SFC may comprise an LTE core network PGW (Packet Data Network Gateway) tunneling traffic from the UE (user equipment), and utilizing virtualized MME (Mobility Management Entity) and SGW (serving gateway) functions on the same platform. An embodiment of this scenario is in the Mobile Edge Core (MEC) or Cloudlet computing model, where wireless LTE traffic is processed and handled at the edge of the LTE network.

Figure 2:
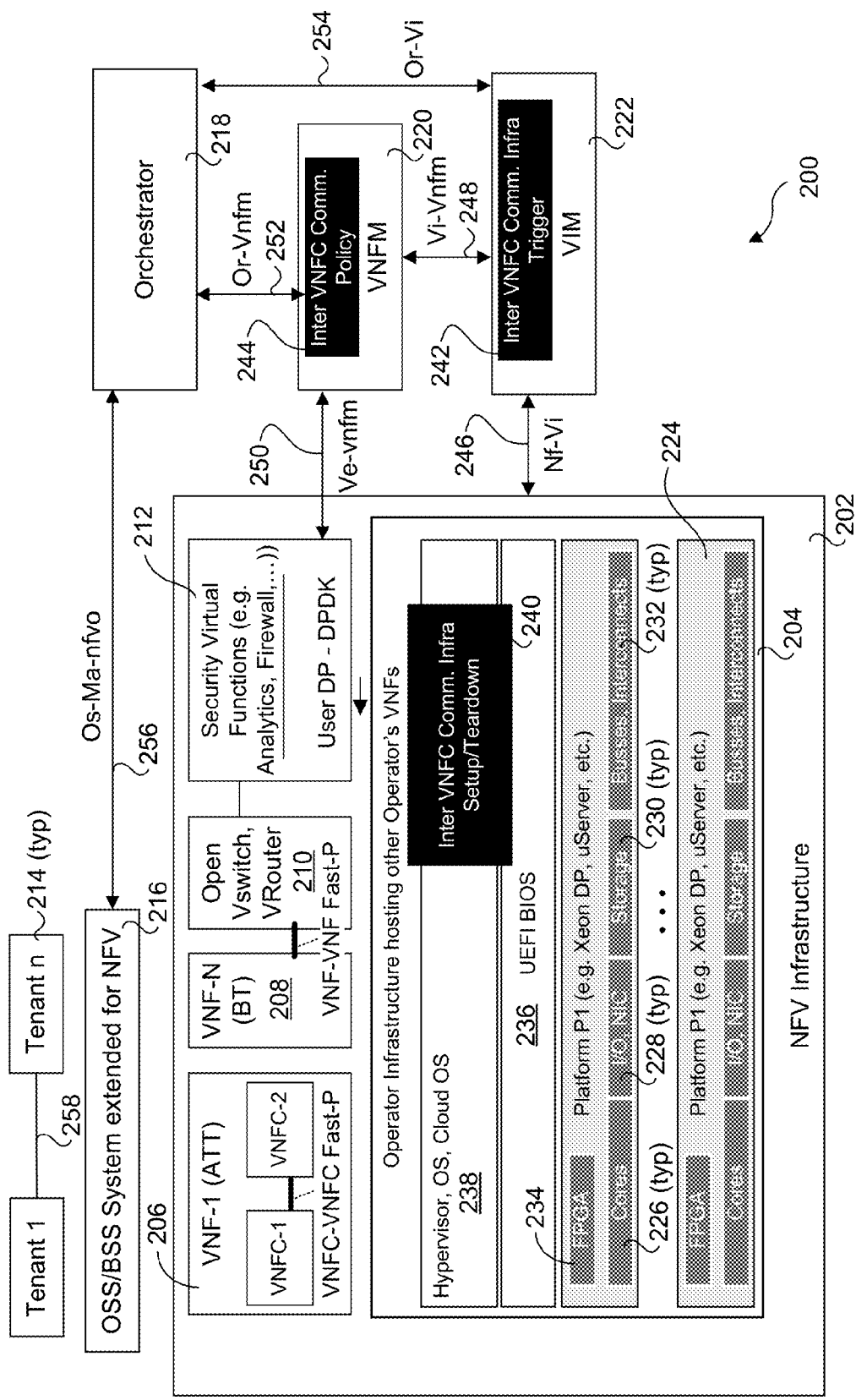
FIG. 2 is a schematic diagram illustrating one embodiment of an NFV system architecture and the components involved in deploying VM-VM, VNF-VNF, and VNFC-VNFC communication capabilities.

ETSI NFV defines a virtual network function (VNF) to be comprised of one or more VNFCs. VNFCs are used for scale out/in as the operator traffic varies. VNFCs appear as a single VNF to the Manageability and Orchestration (MANO) layer. The embodiments described herein may be used for inter-VNFC communication. FIG. 2 illustrates the use of this technique in an NFV environment using VNFC and MANO interfaces.

In further detail, FIG. 2 illustrates one embodiment of an NFV system architecture 200 and the components involved in deploying VM-VM, VNF-VNF, and VNFC-VNFC communication capabilities. NFV system architecture 200 includes NFV infrastructure (NFVI) 202 including operator infrastructure host other operator's VNFs 204, a first VNF 206, and $n^{th}$ VNF 206, an open Vswitch, Vrouter 210, and a security virtual functions block 212. Additional components in NFV system architecture 200 include tenants 214, and OSS/BSS (Operations and Business Support Systems) system 216 extended for NFV, an orchestrator 218, a virtual network function manager (VNFM) 220, and a Virtualized Infrastructure Manager (VIM) 222.

Operator infrastructure host other operator's VNFs 204 includes m NVFI platforms 224. Generally, a variety of different types of platform hardware architectures may be used including single- and multi-socketed server, microservers, etc. In FIG. 2, the exemplary hardware architecture for each NVFI platform 224 includes processor cores 226, I/O and NIC blocks 228, storage 230, busses and interconnects 232, and an FPGA 234. Each platform 224 further includes UEFI (Universal Extensible Firmware Interface) BIOS (Basic Input/Output System) 236, and software 238 including a hypervisor, OS, and cloud OS.

The blocks shown in black relate to Inter-VNFM communication infrastructure, and include a Setup/Teardown block 240, a trigger block 242, and a policy block 244. In addition, NFV system architecture 200 includes multiple reference points between various blocks/components, including an Nf-Vi reference point 246, a Vi-Vnfm reference point 248, a vd-vnfm reference point 250, an Or-Vnfm reference point 252, an Or-Vi reference point 254, an Os-Ma-nfvo reference point 256, and tenant connections 258. There are also two "Fast-Path" connections, including a VNFC-VNFC Fast Path 260 and a VF-VNF Fast-Path 262. Further details of the NFV architecture are described in ETSI (European Telecommunications Standards Institute) GS NFV 002 v1.1.1 (2013-10) Network Functions Virtualization (NFV) Architectural Framework.

VNFM 220 manages the deployments and inter-connections between the VNFCs comprising a VNF, and hence, will deliver the platform capabilities implemented by the embodiment from NFVI 202 to VIM 222 and to VNFM 220. VNFM 220 instructs VIM 222 to setup (or teardown) the instantiation facilities for implementing chain acceleration via Setup/Teardown block 240. VIM 222 will trigger this (via trigger block 242) into the appropriate NFVI platforms 224 which have previously securely instantiated the VNFs/VNFCs. NFVI 204 will use various networking and compute plugins (e.g., Openstack Neutron, Nova) for instantiating this special SFC. A similar flow will be used for terminating the inter VNF/VNFC communication at the time when those VNFs/VNFCs are being scaled-in and terminated.

Once the Cloud OS (e.g., Openstack) engines on the platform initiate the setup of this inter VNF/VNFC fast path communication, the VMM/OS drivers will execute the logic defined next. FPGA 234 is used to implement an FPGA DMA engine. In one embodiment, the FPGA DMA engine operates through the use of Tx/Rx rings (just as a NIC) and provide basic routing capabilities.

The FPGA DMA engine provides a fast-path VM-to-VM communication path enabled by DMA operations between memory assigned to VMs resident on a platform avoiding the overhead of vSwitch software data plane or network stack, as illustrated above in FIG. 1.

In some deployments, the virtualized EPC (vEPC) functions as described above may be interconnected via a user space virtual switch/virtual router. In those scenarios a VNF-to-VNF access can be used. One embodiment assigns the SR-IOV port to the virtual switch/virtual router and packet communication is facilitated between the virtual switch/router to other VNFs.

Figure 3:
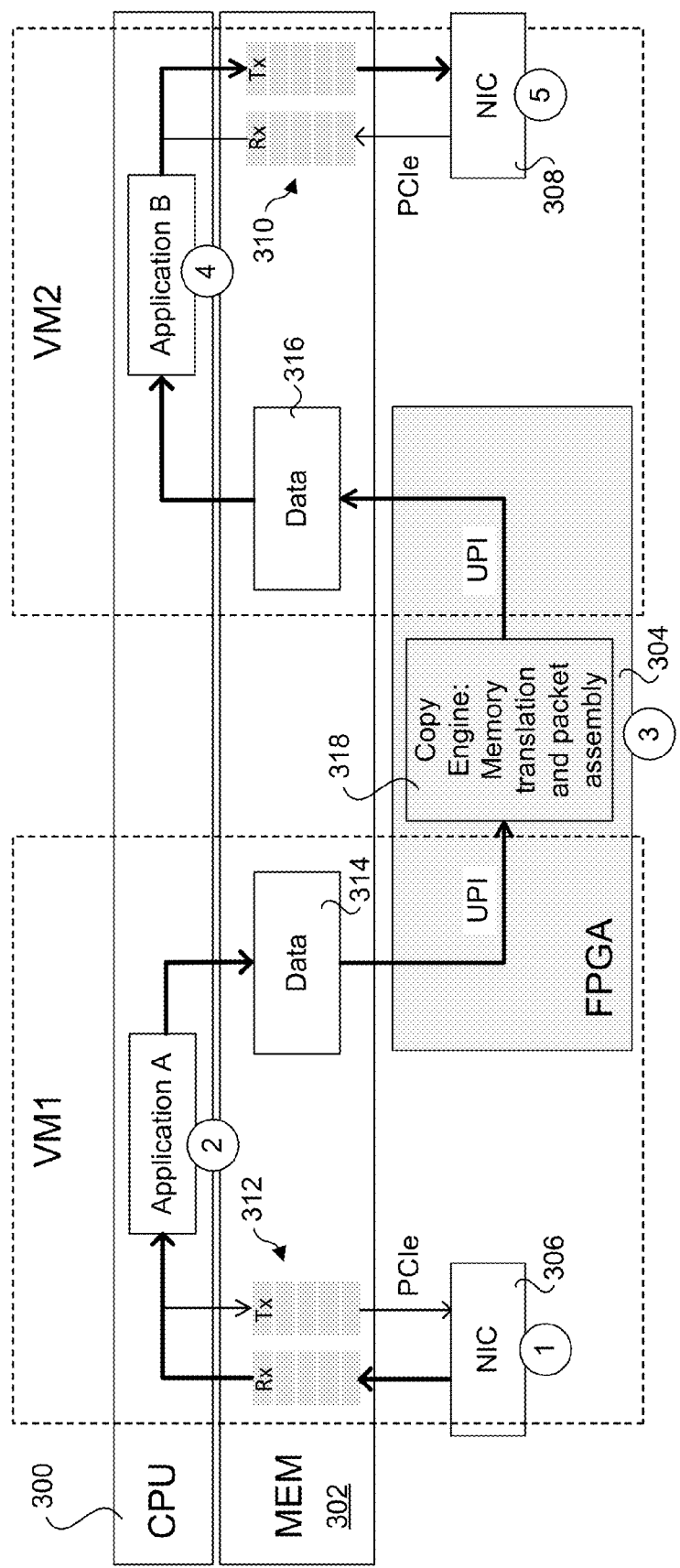
FIG. 3 is a schematic diagram illustrating one embodiment of a VM-to-VM fast-path I/O via an FPGA.

FIG. 3 shows one embodiment of a VM-to-VM fast-path I/O via FPGA. The illustrated components include a central processing unit (CPU) 300, memory 302, an FPGA 304 and NICs 306 and 308. CPU 300 and memory 302 are used to host various service applications, such as depicted by Application A and Application B. Memory 302 includes receive (Rx) buffers 310 and transmit (Tx) buffers 312 (each coupled to a NIC, as shown), and temporarily stores data 314 and 316. FPGA 304 further includes a copy engine 318. In the illustrated embodiment, NICs 306 and 308 are connected to memory 302 via PCIe interconnects and data is transferred between memory 302 and FPGA 304 via Universal Path Interconnects (UPI), which comprises a coherent interconnect. In other embodiments, other types of Interconnects may be used.

FIG. 3 further illustrates forwarding of a data packet, with corresponding operations depicted by encircled numbers. During a first operation, external network traffic comprising packetized data is received from NIC 306. In connection with a second operation, packets received by NIC 306 are examined to determine the next hop along the service chain. For example, the next hop determination can be achieved by investigating the classification header on the packet, such as a NS (Network Services) header. If the packet is leaving the host the packet is routed through the NIC to the network. If remaining within the host the packet is passed along to the hardware fast path. In one embodiment, software enjoins the descriptor for the packet and its transmit destination for FPGA 304.

During the third operations, FPGA 304 uses information/handle from the descriptor to determine which VM or VNF/VNFC to target. FPGA 304 retrieves a receive descriptor from the target VM/VNF/VNFC to identify memory to accept the packet. FPGA 304 assembles source address+VM, target address+VM, and size information for data movement. The FPGA may edit/modify the packet header as needed. Header edit/modification information is stored in the memory/table accessible by the FPGA and accessed by an index derived from the handle. The software control plane (e.g. vSwitch or service function forwarded (SFF)) that uses the FPGA sets up the tables and packet edit actions.

Next, FPGA 304 moves data from source to target, and informs the sender of completion. FPGA 304 then informs the receiver of data availability. The packet is processed by an application (service function) in the receiving environment, and continues along the chain of VMs according to the next HOP, as depicted by operation 4. The last application in the service chain may send the (now processed packet data) back onto the network via NIC 308, as depicted by operation 5.

In another embodiment FPGA 304 implements a vNIC or virtual IO (virtIO) backend whereby the front end of the vNIC or virtual IO provides direct network semantics to the virtual machine (or service function or VNF implemented in a virtual machine). In this embodiment a packet parser/classifier and entire forwarding function including packet editor is implemented in hardware in FPGA 304.

This embodiment begins by fetching data from the VM data buffer using a descriptor in a similar manner to that described above. The FPGA parses the packet header, performs classification/lookup of relevant headers (e.g. L2/L3/L4) and determines the next hop address for forwarding. The FPGA also fetches the forwarding action, and performs header modification actions such as header removal, editing, insertion or encapsulation, network address or port address translation. The FPGA then performs forwarding of the packets to the destination VM if in the same host. Optionally, the FPGA forwards frames to the physical network through a physical or virtual NIC to the external network if the destination is external to the host.

In another embodiment the FPGA also implements stateless offload functions such as Transmit Segmentation Offloads (TSO) Checksum offloads (CSO), and Receive side scaling (RSS). In yet another embodiment the FPGA also implements Multicast forwarding functionality so the data from a single VM could be copied to multiple destination VMs in hardware. The forwarding action described above is performed on each multicast copy.

The forwarding database in the FPGA hardware data plane is set up by the control plane of virtual switch or virtual router or service function forwarder or similar functions. Any exception packets that cannot be handled in the hardware fast-path within the FPGA are sent to the software data plane for further processing.

The embodiments enable dynamic use of the FPGA resource for VNFC/VNFC communication as needed and determined by the management and orchestration engines. As per design, the FPGA can be dynamically assigned a programmed logic as per the scale in/out needs of the platform. The embodiments allows an operator to use the FPGA as and when needed (e.g. SLA driven) for setting up this fast path. For these usages, FPGA is better than using fixed function logic, as the logic can be turned on/off as per VNF scale out demands of the traffic "spikes". This can be a dynamic operation. When not needed, the FPGA can be used for other acceleration functions.

Other aspects of the embodiments relate to components (including dedicated and flexible accelerators) to automatically optimize virtual environments. More specifically, these embodiments are directed at dynamic scale-out of network function virtual infrastructure (NFVI) components deployed automatically using the following operations, in one embodiment:

(1) detects VNF/VM overload condition;
(2) identifies offending task causing the condition;
(3) selects need-based acceleration based on the offending task (e.g., crypto IPSec);
(4) Securely loads the VNF/VM allocation FPGA with the selected needs-based acceleration;
(5) offloads offending overload task using the FPGA; and
(6) Securely unloads the FPGA when the overload condition is no longer relevant.

In one embodiment, the FPGA is programmed using a new security algorithm to alleviate a VM/VNF overcapacity limitation caused by an increase in Cloud-Based Shopping Cart transactions. More specifically, a Cloud-Service Provider (e.g., e-commerce site) during a sales event needs to simultaneously and securely support customers providing Credit Cards to make purchases requiring the use of Public Key Encryption which uses the RSA encryption algorithm to establish a secure session between the client customer and the cloud server (i.e., PKE RSA 2 k-bit key decryption). For example, handling 14,000 customers requiring an equal number of encryption handshakes per second consumes up to 20 Xeon E5 v3 CPU cores.

In more stringent deployments where customer Service Level Agreements (SLAs) are critical (e.g., as in Operator and Telco networks), it is increasingly important to deliver dynamic programmability and needs-based acceleration for alleviating intermittent workload spikes. For instance, VPN tunnel terminations may be offloaded dynamically to FPGAs. In another embodiment, virtual switch/virtual routers in the VMM/OS or in user data plane may start dropping packets in traffic spikes in which case vSwitch/vRouters processing may be offloaded to an FPGA.

Thus, the embodiments help the Operators to deliver on their SLAs, which are a critical aspect of their business, avoiding the need for relocation/migration of VM/VNFs for temporary spikes by adding new Compute/Networking infrastructure. By identifying and assigning FPGA hardware acceleration capacity instead of general-purpose CPU capacity, the VM is in a position to keep below predetermined compute limits—while using the existing underlying server hardware. In turn, this allows Cloud Service Providers and NFV Operators to maximize their efficiency of their existing hardware.

There are a number of approaches that the system can use to detect and trigger a transition to/from an FPGA implementation of a particular algorithm. These triggering events may be generated by hardware, software (either user- or system-level), or some combination of both. The inputs to the triggering function could be measured from data sources or inferred via heuristics. Further, the triggers may be initiated either proactively in response to an expected demand and reactively in response to an observed demand.

For example, orchestration software such as INTEL® Node Manager could monitor the types of flows being handled on a managed platform. When orchestration notices that the TDP demands (using that as a proxy for CPU load) are increasing on a platform that is handling flows that demand a lot of crypto, it could trigger the transition. Alternatively, that same orchestration software could also predict that a newly-created flow will need significant cryptography capabilities and preemptively deploy the FPGA-based accelerators ahead of time. Note also that these triggers need not occur in an orchestration layer, individual platforms could apply these same techniques locally to the same end.

Cloud Service Providers bill for resources used, and in more sophisticated Operator deployments, the billing is reliant on SLAs and measurement of networking services delivery. Typically, service providers bill their end-customers based on actual compute (i.e., "Clock hours of Server time") and storage used by the cloud as well as the amount of data transfers in and out of the particular cloud.

Some embodiments dynamically enhance the amount of compute and networking resources available by using FPGA workload-specific accelerators. For example, as applications build-in and deploy more security features, cloud platform compute utilization rises and becomes constrained, as illustrated in above embodiments. By automatically assigning FPGA workload-specific acceleration to relieve cloud platform compute and networking bottlenecks, service providers can maximize Server efficiency and obtain a capability that allows them to adjust business "clock hours" billing and maintaining SLAs.

The benefits of this approach can be extended to include a variety of cloud platform configurations, including networking used for software defined networking deployments. Security features are used to encrypt network traffic and authenticate users not only within a particular data center but also between networked data centers, or even between Compute Nodes within an NFVI. This is an ETSI NFV defined networking security requirement, on hosted infrastructure for third party VNFs.

Today, cloud platforms typically handle increased demands by increasing the availability of general CPU compute capabilities. In contrast, some embodiments use workload-specific hardware-acceleration (instead of general purpose CPUs) to offload specific application workloads. Security workloads in particular are more efficiently handled using targeted purpose-built hardware acceleration.

Under both a Data Center Networking and an NFV scheme, efficiency is critical. The embodiments provides a method to detect and respond to increase the capability of Cloud-based Servers to handle increased application load by using FPGA acceleration rather than general-purpose CPUs. By using FPGA acceleration to offload compute-intensive tasks, Service Providers can maximize efficiency of their existing equipment.

In accordance with aspects of the embodiments, techniques are provided for maximizing Data Center Server Resources while at the same time minimizing compute bottlenecks that impact the ability to handle customer application load. NFV/SDN and Data Center Cloud Service Assurances, often included in SLAs, are necessary to achieve a "programmable network" (e.g., SDI, NFV). Service Assurances depend on the availability of compute resources to handle increased customer usage. As concerns over security and storage usage grow so too does the demand for the processing power to handle compute-intensive security operations (e.g., authentication, and data encryption/decryption). Securing and storing data is compute-intensive, so much so that specialize hardware-acceleration is used frequently to handle (or offload) tasks that if done on general purpose CPUs would be costly both in terms of CPU and latency. The embodiments provide a method of managing a pool of FPGA workload-specific hardware-acceleration resources (accelerators) together with a group of virtual machines and virtual network functions (operator clouds), wherein after determining that a particular cloud instance is near maximum compute capacity (at risk of overload), accelerators are dynamically assigned to offload certain compute-intensive workloads without having to migrate to a more capable cloud. In practical terms, this invention helps Data Centers get the most out of the equipment (i.e., Servers) they have. The embodiments identify overloaded Servers that can benefit from workload-specific hardware-accelerators, then dynamically assigns acceleration to the overloaded Servers to reduce Server stress. The accelerator(s) offload workload-specific compute-intensive tasks that would have otherwise been handled by less efficient general purpose CPUs. This has the effect of "resizing" (i.e., determining the offending tasks and then assigning targeted hardware-acceleration) the Server, thereby reducing the need to migrate to a more capable and more expensive Server.

Overloaded servers can be identified through a variety of techniques including hardware monitors (such as performance counters), software instrumentation (using tools such as Intel Node Manager) in the OS or application, or some combination of the these. The overload conditions can be detected or predicted either locally on the platform or remotely in a management layer such as an orchestrator. The system may respond either reactively to observed overload conditions or preemptively to avoid overload conditions by deploying extra hardware earlier.

Table 1 below shows some examples of task that may benefit from the techniques disclosed herein:

TABLE 1

| Examples of Offending Tasks | BEFORE applying purpose-specific acceleration | AFTER applying purpose-specific acceleration |
| --- | --- | --- |
| TASK: Public Security Key Security (e.g., e-commerce Shopping Cart., RSA 2k-bit decrypts) | Limited by MAX CPU capacity assigned to Cloud | Cloud compute capacity increases as TASK is "offloaded to purpose-specific FPGA accelerator |
| TASK: Securing Web Server Traffic (e.g., HTTPS) | Limited by MAX CPU capacity assigned to Cloud | Offload compute-intense TASK leaving more CPU cycles free |
| TASK: Real-Time Data Compression (e.g., GZIP) | Limited by MAX CPU capacity assigned to Cloud | Offload compute-intense TASK leaving more CPU cycles free |

Figure 4:
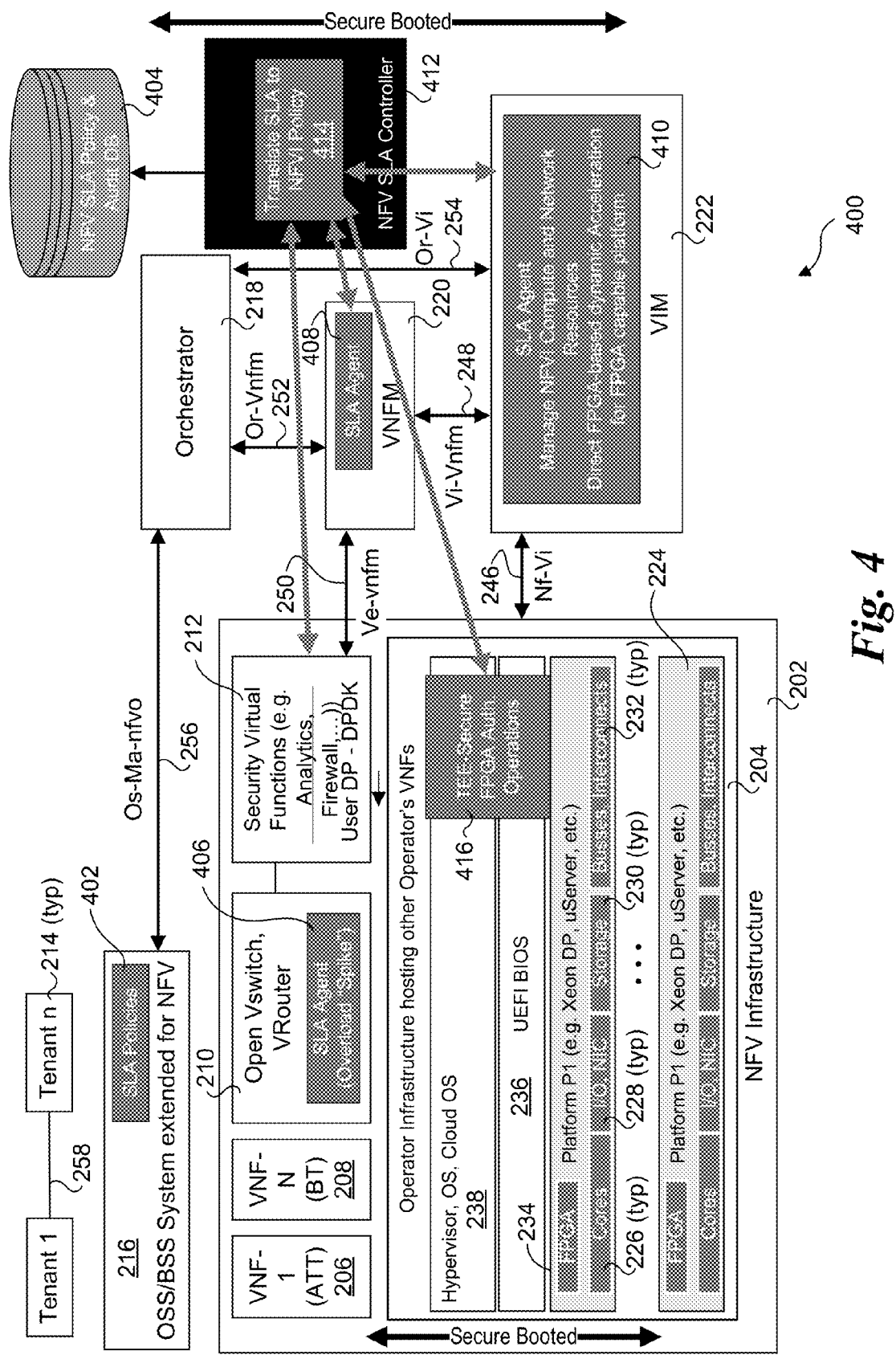
FIG. 4 is schematic diagram illustrating an embodiment of an NFV system architecture for Operator NFV cloud system that is configured to support dynamic scale-out for FPGA-based acceleration.

FIG. 4 show an embodiment of an NFV system architecture 400 for Operator NFV cloud system that is configured to support dynamic scale-out for FPGA-based acceleration. As indicated by like reference numbers, many of the components in NFV system architecture 400 and NFV system architecture 200 of FIG. 2 are configured similarly and/or perform similar functions. In addition, NFV system architecture 400 further includes SLA policies 402, an NFV SLA policy and audit database 404, and SLA agents 406, 408 and 410, an NFV SLA controller 412, a translate SLA to NFVI policy 414, and TEE-secure FPGA authorized operations 416.

FIG. 4 further illustrates the SLA flow across an NFV deployment. It is also envisioned that the policy for FPGA acceleration will be administrated by the NFV MANO entities, as shown. VIM 222 will also maintain inventory of platforms that are capable of FPGA dynamic expansion as it will then influence scale-out/in decisions by VNFM 220 and Orchestrator 218. The platform (NFVI 202) will perform auto secure programming of the FPGA(s) 234 and perform authorization checks prior to offloading any specific task. The secure authorization will be performed by a secure trusted execution environment like the INTEL® Secure Enclave (SGX), Converged Security and Manageability Engine (CSME), Innovation Engine (IE), etc. The NFVI TEE Trusted Execution Environment (TEE) may communicate with the TEE in VIM 222 and NFV SLA Controller 412 to detect and deploy secure dynamic FPGA offload.

Figure 5:
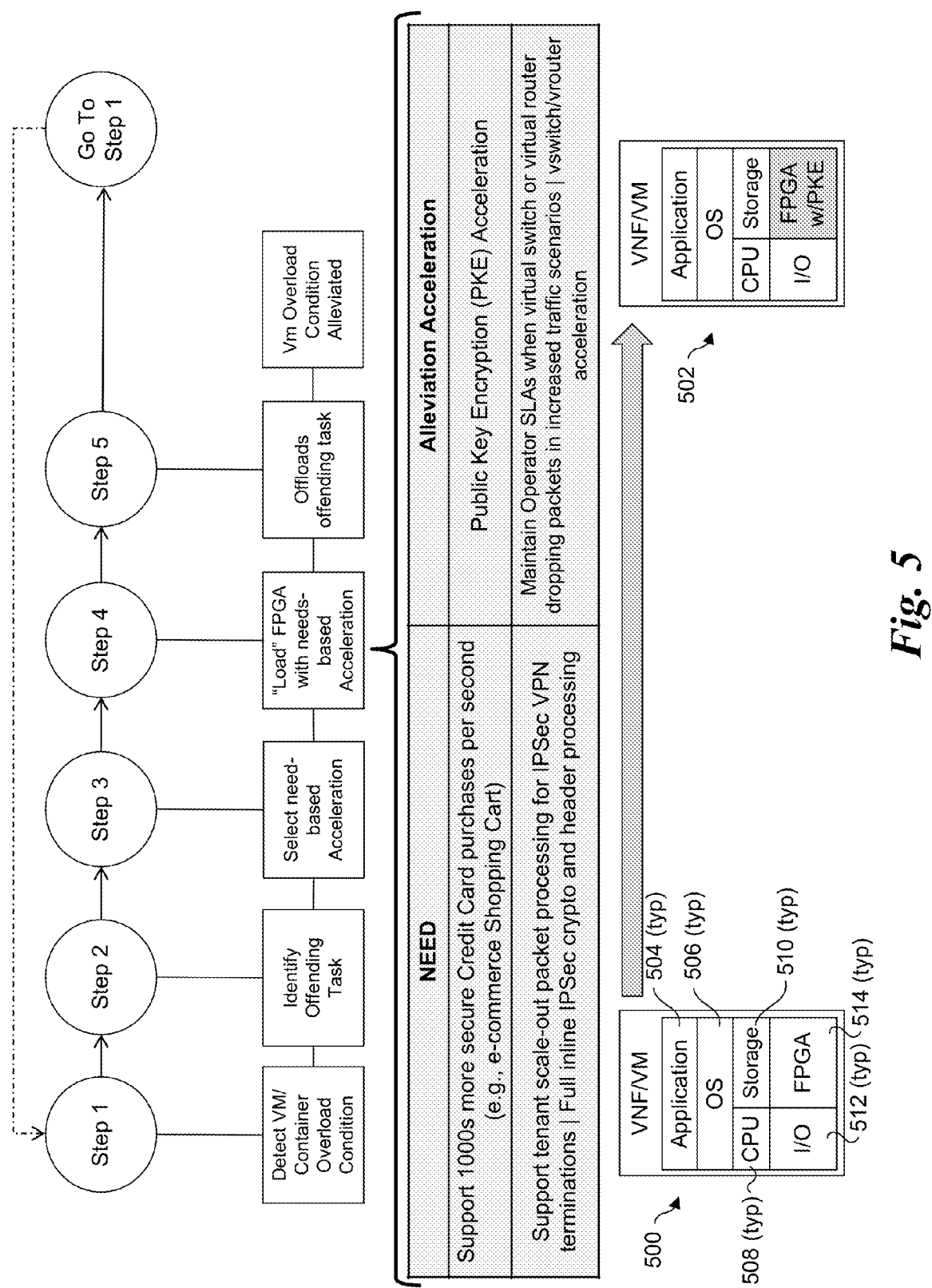
FIG. 5 is a diagram illustrating an example of automatic needs-based hardware-acceleration assignment scale-out for resource optimized virtual applications for NFV using the NFV system architecture of FIG. 4.

FIG. 5 shows an example of automatic needs-based hardware-acceleration assignment scale-out for resource optimized virtual applications for NFV using NFV system architecture 400. Each of VNF/VMs 500 and 502 include an application 504, an operating system 506, a CPU 510, storage 510, I/O 512, and an FPGA 514.

During a first step, the VM or container detects and overload condition, and the offending task is identified during step 2. An applicable needs-based acceleration is selected in step 3, follow by loading FPGA 514 with needs-based acceleration in step 4. This the offloads the offending task, alleviating the VM overload condition, as shown in step 5, with the processing looping back to step 1 to detect the next VM/container overload condition.

Figure 6:
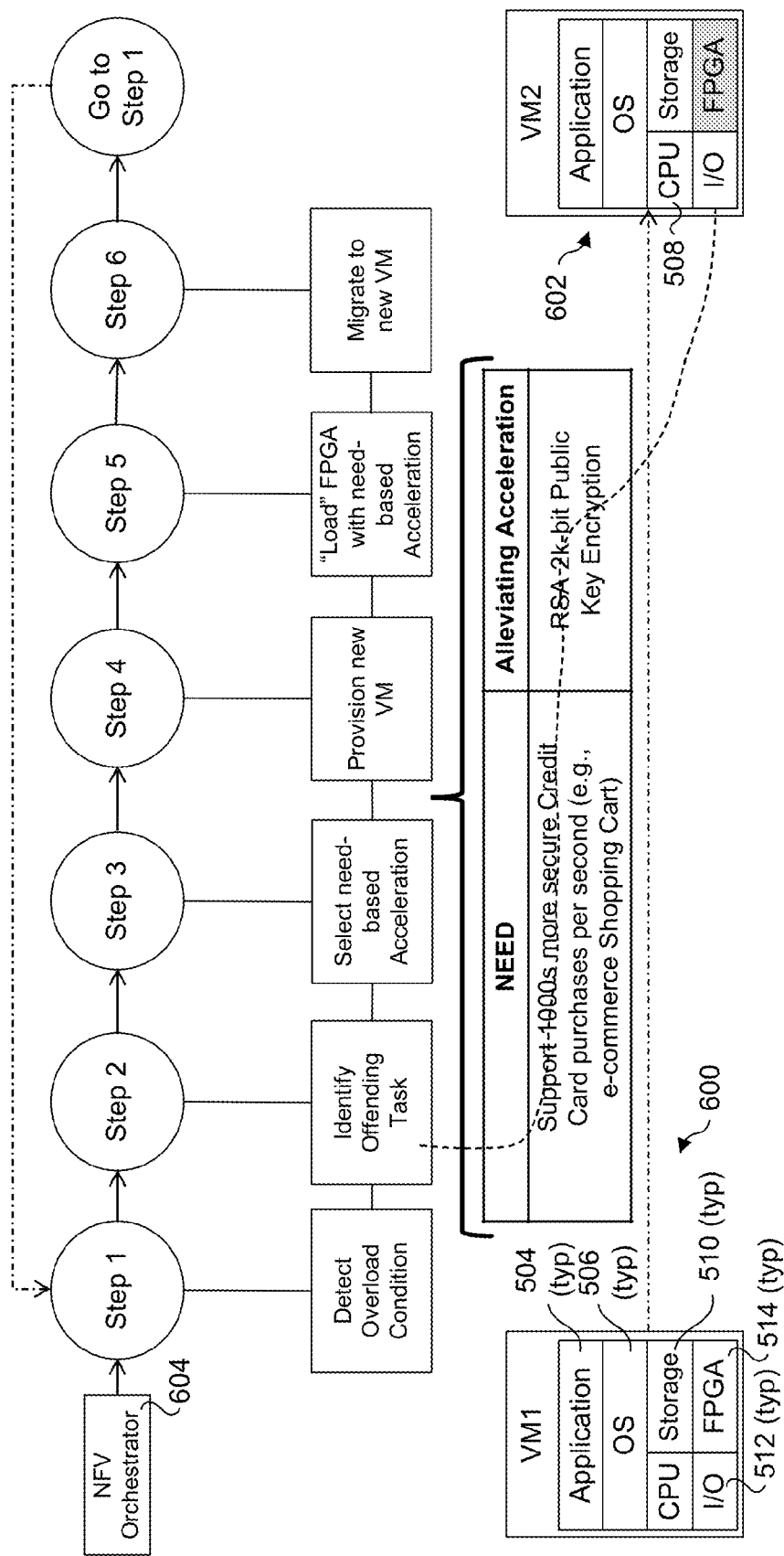
FIG. 6 is a diagram illustrating an example of a method for needs-based self-correcting dynamic acceleration assignment for VMs using the NFV system architecture of FIG. 4.

FIG. 6 shows an example of a method for needs-based self-correcting dynamic acceleration assignment for VMs using NFV system architecture 400. As before, each of VNF/VMs 600 and 602 include an application 504, an operating system 506, a CPU 510, storage 510, I/O 512, and an FPGA 514.

NFV orchestrator 604 initially configures the system for performing the method, with the task or tasks being performed on VM 600. In step 1, an overload condition is detected, with the offending task identified in step 2. A needs-based acceleration is selected in step 3, with a new VM (e.g., VM 602) being provisioned in step 4. FPGA 514 is then loaded with the selected need-based acceleration in step 5, followed by migration to the new VM, which takes over processing of the task(s). The loop then returns to step 1.

Figure 7:
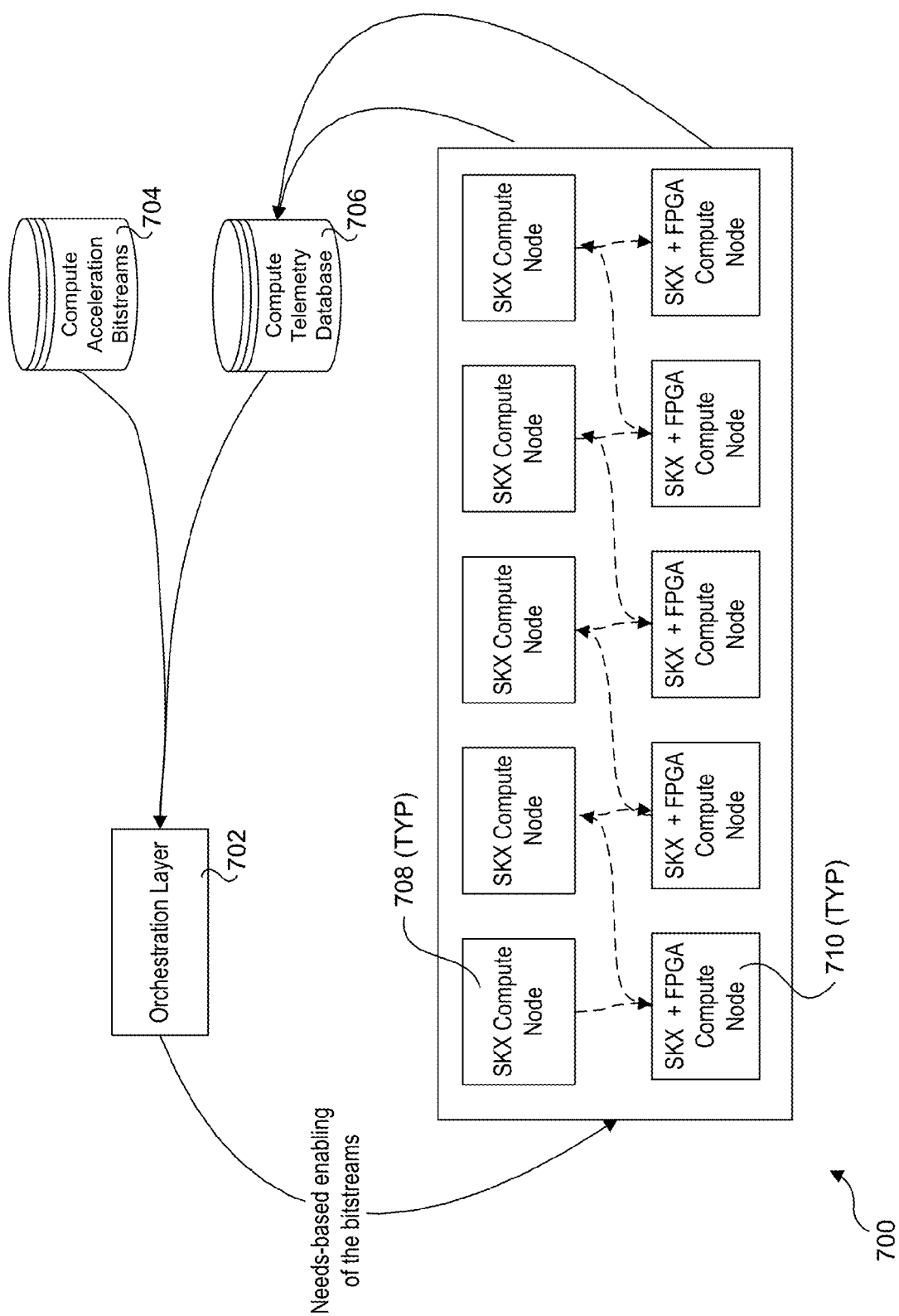
FIG. 7 shows a conceptual diagram for an exemplary delivery system for needs-based FPGA acceleration using a combination of standard servers and or standard servers with programmable logic (e.g., FPGA) in a Server Rack configuration orchestrated by NFV.

FIG. 7 shows a conceptual diagram for an exemplary server rack 700 and associated delivery system for needs-based FPGA acceleration of bitstreams orchestrated by NFV. As illustrated, server rack 700 includes and orchestration layer 702, compute accelerations data 704, a compute telemetry database 706, a plurality of Skylake (SKX) compute nodes 708, and a plurality of SKX with FPGA compute nodes 710. Server rack 700 utilizing a combination of standard servers (SKX compute nodes 708) as well as standard servers with programmable logic available for acceleration offload (SKX+FPGA compute nodes 710). The rack is orchestrated by orchestration layer 702 to serve dynamic workloads using particular bitstreams stored in compute accelerations data 704 compute telemetry database 706.

Figure 8:
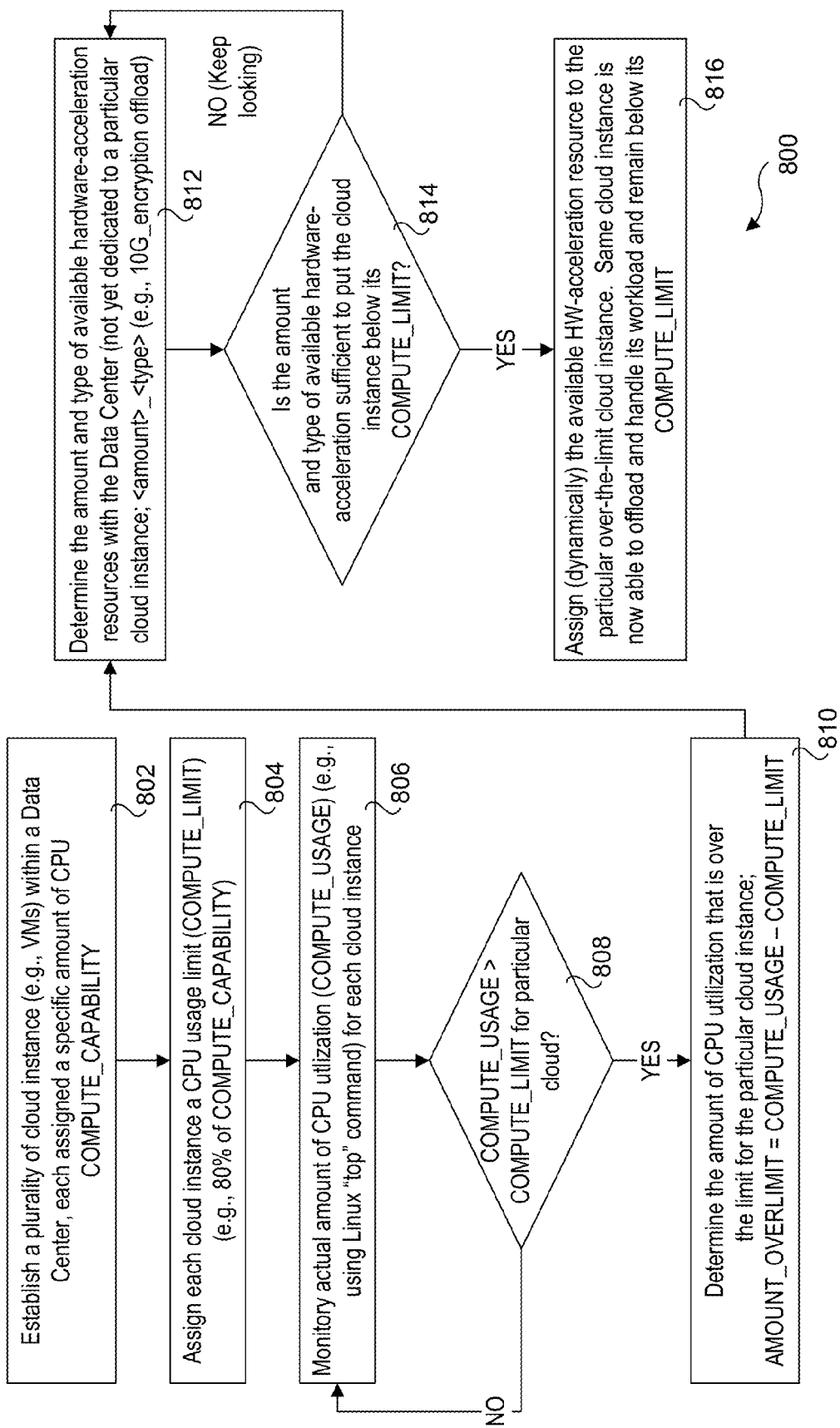
FIG. 8 is a flowchart illustrating operations and logic for implementing dynamic hardware-acceleration, according to one embodiment.

FIG. 8 shows a flowchart 800 illustrating operations and logic for implementing dynamic hardware-acceleration, according to one embodiment. In a block 802, a plurality of cloud instances (e.g., VMs) are established within a data center. Each cloud instance is assigned a specific amount of CPU computer capability (referred to as COMPUTE_CAPABILITY). In a block 804, each cloud instance is assigned a CPU usage limit (COMPUTE_LIMIT). For example, a typical COMPUTE_LIMIT might be 80% of COMPUTE_CAPABILITY). In a block 806, ongoing monitoring of actual CPU utilization (COMPUTE_USAGE) is performed for each instance. For example, for Linux servers CPU utilization can be observed using the Linux "top" command.

In a decision block 808 a determination is made to whether the actual CPU utilization exceeds the CPU usage limit established in block 804 for a particular cloud instance, i.e., COMPUTE_USAGE>COMPUTE_LIMIT. As depicted by the NO result, the determination of decision block 808 is made on an ongoing basis.

If the answer to decision block 808 is YES, the logic proceeds to a block 810 in with a determination is made to the amount of CPU utilization that is over the limit for the particular cloud instance, e.g., AMOUNT_OVERLIMIT=COMPUTE_USAGE–COMPUTE_LIMIT. Next, in a block 812 a determination is made to the amount and type of available hardware-acceleration available with the data center using resources that currently aren't dedicated to any particular cloud instance. For example, an amount and type of available hardware acceleration could facilitate a 10 G (Gibabit/s) encryption offload function.

In a decision block 814 a determination is made to whether the amount and type of available hardware-acceleration is sufficient to put the cloud instance below its COMPUTE_LIMIT. If not, a search for available hardware-acceleration is continued. Once available hardware-acceleration resources that are sufficient to put the cloud instance below its COMPUTE_LIMIT have been found, the available hardware-acceleration resources are dynamically assigned to the particular over-the-limit cloud instance in a block 816. The same cloud instance is now able to offload a portion of it CPU load, permitting it to stay below its COMPUTE_LIMIT.

Figure 9A:
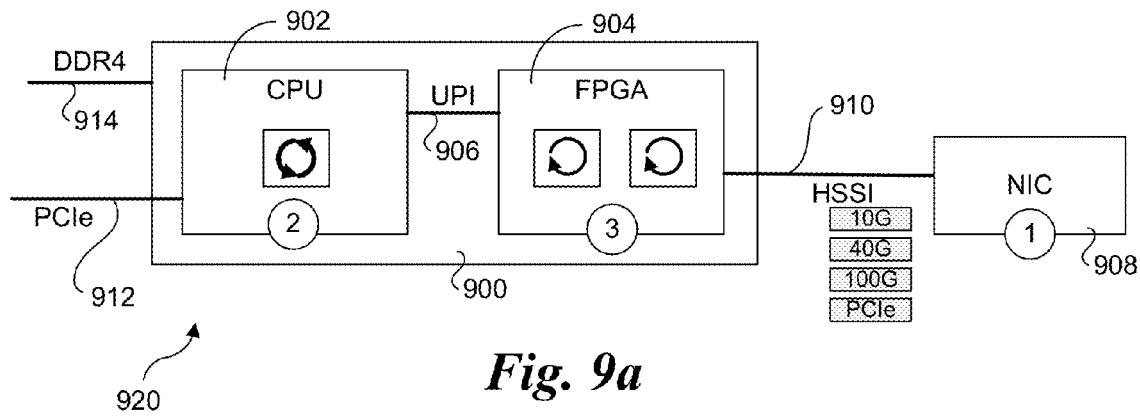
FIG. 9a shows a platform is configured to implement look-aside acceleration via an HSSI.
Figure 9B:
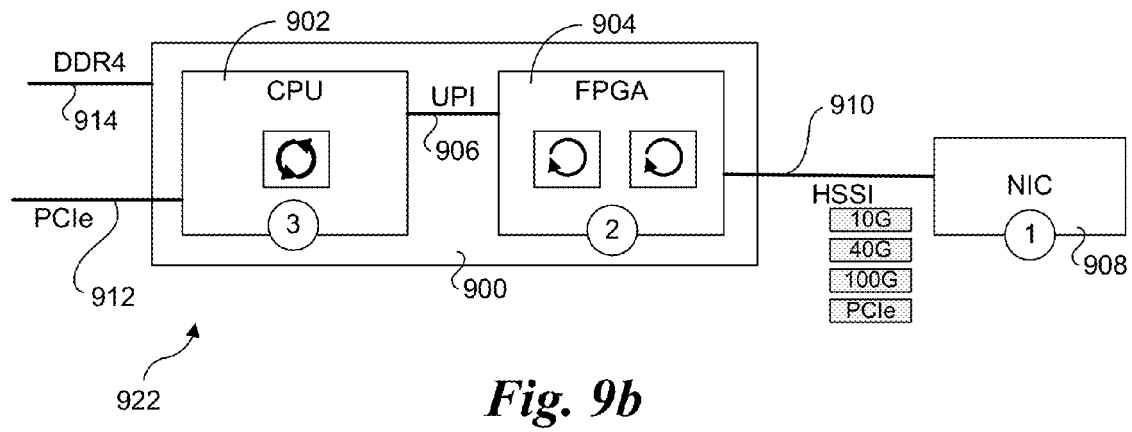
FIG. 9b shows a platform configured to implement in-line packet processing.
Figure 9C:
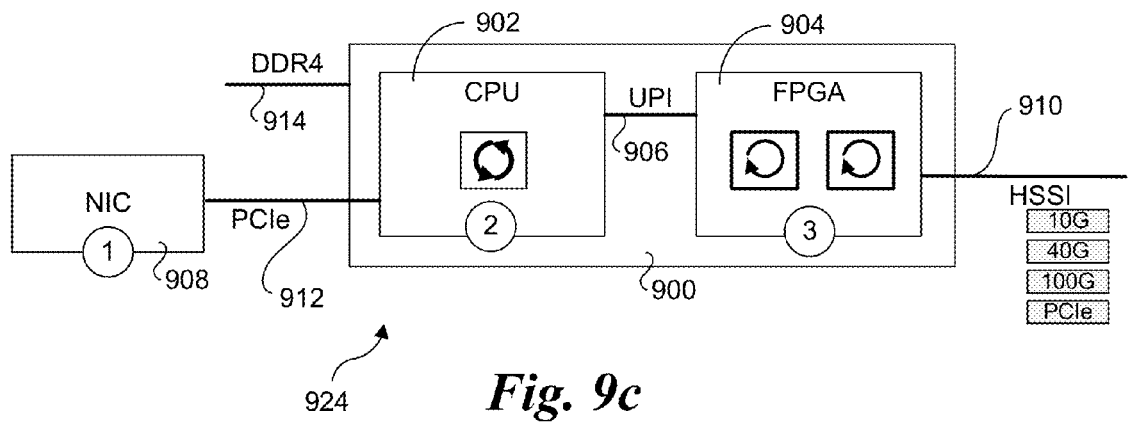
FIG. 9c shows a platform configured to implement partial vSwitch function acceleration.

FIGS. 9a-9c show examples of different usages that benefit from hardware acceleration. Each of the platform configuration has similar components, including a package 900 including a CPU 902 coupled to an FPGA 904 via a UPI link 906. Package 900 is connected to a NIC 908 via a High-Speed Serial Interconnect (HSSI) link 910. Packege 900 is further depicted as including a PCIe link 912 and one or more channels 914 providing access to DDR4 memory. Exemplary but non-limiting HSSI links included a 10 G link, a 40 G link a 100 G link and a PCIe link.

FIG. 9a a platform 920 is configured to implement look-aside acceleration via HSSI 910. An exemplary usage is compute-intensive compression and security offload. Data received from NIC 908 is processed by CPU 902 with part of the processing task(s) being offloaded to FPGA 904. This scheme provides low latency acceleration via a coherent interconnect (UPI 906).

In FIG. 9b a platform 922 is configured to implement in-line packet processing. Packets received from a network by NIC 908 are forwarded to FPGA 904 for initial processing, with the whole of the packet processing tasks divided between FPGA 904 and CPU 902. For example, this configuration supports real-time packet processing, such as inspection, classification, compression, encryption, etc.

In FIG. 9c a platform 924 is configured to implement partial vSwitch function acceleration. Packet data from NIC 908 is forwarded to CPU 902 via PCIe link 912. During processing of data extracted from the packets, FPGA 904 is configured to support vSwitch function acceleration, such as discussed above with reference to FIG. 1.

Further aspects of the subject matter described herein are set out in the following numbered clauses:

1. A method performed on a compute platform including a host processor, memory, a network interface card (NIC) and a Field Programmable Gate Array (FPGA) Direct Memory Access (DMA) engine, the host processor running a Hypervisor in which a virtual switch is implemented and hosting a plurality of virtual machines (VMs) running a plurality of service application including service application comprising virtual network functions (VNFs), the plurality of service applications comprising a service chain, the method comprising:
   determining a next hop along the service chain of service applications from a first service application to a second service application; and
   employing the FPGA DMA engine to transfer data along a hardware fast path between a portion of memory associated with the first service application and portion of memory associated with the second service application.

2. The method of clause 1, further comprising:
   receiving a packet at the NIC;
   processing the packet using a service application;
   examining the packet to determine the next hop along the service chain;
   enjoining a descriptor for the packet to transmit and its destination for the FPGA DMA engine; and
   identifying, using the FPGA DMA engine via the descriptor, a target VM, VNF or virtual network function component (VNFC) corresponding to the next hop.

3. The method of clause 1 or 2, further comprising:
   retrieving, via the FPGA DMA engine, a receive descriptor from the target VM, VNF, or VNFC; and
   moving data pertaining to the packet from the service application to the target VM, VNF, or VNFC.

4. The method of clause 3, further comprising assembling, via the FPGA DMA engine, a source address, target address, and size information relating to movement of the data.

5. The method of clause 3 or 4, wherein the FPGA DMA engine performs further operations comprising:
   informing the first service application of completion of moving the data; and
   informing the target VM, VNF, or VNFC of availability of the data that is moved.

6. The method of any of clauses 3-5, wherein the packet includes a header, and the method further comprises modifying the packet header via the FPGA DMA engine.

7. The method of any of the preceding clauses, wherein the CPU is coupled to the FPGA DMA engine via a coherent interconnect.

8. The method of any of the preceding clauses, wherein the fast path data transfer corresponds to a VNF-to-VNF data transfer.

9. The method of any of the preceding clauses, wherein the plurality of service applications include software-based virtual network function components (VNFCs), and the fast path data transfer corresponds to a VNFC-to-VNFC data transfer.

10. A compute platform, comprising:
    a processor;
    memory, operatively coupled to the processor,
    a network interface card (NIC), operatively coupled to the processor;
    a Field Programmable Gate Array (FPGA) operatively coupled to the processor; and
    storage in which software instructions are stored configured to be executed on the processor, the software instructions including instructions corresponding to a Hypervisor in which a virtual switch is implemented, a plurality of machines (VMs), a plurality of service application including service application comprising virtual network functions (VNFs), the plurality of service applications comprising a service chain,
    wherein the compute platform is configured to perform operations implemented via execution of the software instructions and logic programmed in the FPGA including,
    determining a next hop along the service chain of service applications from a first service application to a second service application; and
    employing the FPGA as a Direct Memory Access (DMA) engine to transfer data along a hardware fast path between a portion of memory associated with one of a first VM running the first service application and the first service application and portion of memory associated with one of a second VM running the second service application and the second service application.

11. The compute platform of clause 10, wherein the compute platform is configured to perform further operations, when operating, comprising:
    receiving a packet at the NIC;
    processing the packet using a first service application;
    examining the packet to determine the next hop along the service chain; and
    enjoining a descriptor for the packet to transmit and its destination for the FPGA DMA engine,
    and wherein the FPGA is further configured to identify, via the descriptor, a target VM, VNF or virtual network function component (VNFC) corresponding to the next hop.

12. The compute platform of clause 11, wherein the FPGA is further configured to:
    retrieve a receive descriptor from the target VM, VNF, or VNFC; and
    move data pertaining to the packet from the first service application to the target VM, VNF, or VNFC.

13. The compute platform of clause 12, further comprising:

assembling, via the FPGA DMA engine, a source address, target address, and size information relating to movement of the data;

14. The compute platform of clause 12 or 13, wherein the FPGA is configured to, when operating:
   inform the first service application of completion of moving the data; and
   inform the target VM, VNF, or VNFC of availability of the data that is moved.

15. The compute platform of any of clauses 12-14, wherein the packet includes a header, and the FPGA is further configured to modify the packet header.

16. The compute platform of any of clauses 10-15, wherein the processor and the FPGA are part of a package and the processor is coupled to the FPGA via a coherent interconnect.

17. The compute platform of any of clauses 10-16, wherein the hardware fast path data transfer corresponds to a VNF-to-VNF data transfer.

18. The compute platform of any of clauses 10-17, wherein the plurality of service applications include software-based virtual network function components (VNFCs), and the hardware fast path data transfer corresponds to a VNFC-to-VNFC data transfer.

19. A method performed in a Network Virtualization Function (NVF) environment comprising a plurality of compute platforms, each compute platform including a host processor, memory, a network interface card (NIC) and a Field Programmable Gate Array (FPGA), the host processor hosting a plurality of virtual machines (VMs) running a plurality of service applications including service applications comprising virtual network functions (VNFs), at least a portion of the FPGAs configured to support one or more needs-based purpose-specific hardware acceleration, the method comprising:
   detecting an overload condition for a VNF or VM;
   identifying an offending task causing the overload condition; and
   dynamically offloading the offending task to an FPGA configured to perform the offending task.

20. The method of clause 19 further comprising:
   selecting a needs-bases acceleration based on the offending task; and
   securely loading the FPGA with the selected needs-based acceleration.

21. The method of clause 20, wherein the needs-based acceleration is used to perform cryptography operations.

22. The method of any of clauses 19-21, further comprising:
   setting host processor usage limits for at least a portion of the VMs on the compute platforms;
   monitoring host processor usage for the VMs for which host processor usage limits are set;
   detecting that a VM has exceeded its host processor usage limit;
   determining an amount and type of available hardware-acceleration resources within the NVF environment; and
   dynamically assigning an available hardware-acceleration resource to offload a portion of workload for the VM from its host processor to the hardware-acceleration resource.

23. The method of any of clauses 19-22, wherein the NVF environment comprises a data center used to host an e-commerce site, and the portion of workload being offloaded includes at least one of encryption and decryption operations.

24. The method of any of clauses 19-23, wherein the needs-based acceleration replaces virtual switch or virtual router operations performed by the VM that has exceed its host processor usage limit with hardware-based virtual switch or virtual router acceleration.

25. The method of any of clauses 19-24, wherein the NVF environment includes components defined by the ETSI (European Telecommunications Standards Institute) Network Functions Virtualization (NFV) Architectural Framework.

26. The method of clause 25, wherein the NVF environment includes a plurality of virtual network function components (VNFCs) including an inter-VNF communication infrastructure setup/teardown component and an inter-VNF communication policy component.

27. The method of clause 25, wherein the NVF environment includes a plurality of service level agreement (SLA) components including a first SLA agent operating on NFV infrastructure, a second SLA Agent associated with a virtual network function manager (VNFM), and a third SLA agent associated with a virtualized infrastructure manager (VIM).

28. The method of clause 27, wherein the plurality of SLA components further include an NFV SLA controller that is configured to communicate with each of the first, second and third SLA agents.

29. The method of clause 28, wherein the NFV SLA controller includes an SLA to NFV infrastructure (NFVI) policy translator that is configured to communicate with each of the first, second and third SLA agents.

30. The method of clause 27, wherein the third SLA agent associated with the VIM is configured to manage NFV infrastructure (NFVI) compute and network resources and to direct FPGA-based dynamic acceleration.

31. A method performed in a Network Virtualization Function (NVF) environment comprising a plurality of compute platforms, each compute platform including a host processor, memory, a network interface card (NIC) and a Field Programmable Gate Array (FPGA), the host processor hosting a plurality of virtual machines (VMs) running a plurality of service applications including service applications comprising virtual network functions (VNFs), at least a portion of the FPGAs configured to support one or more needs-based purpose-specific hardware acceleration, the method comprising:
   detecting an overload condition for a first VM;
   identifying an offending task causing the overload condition;
   identifying an FPGA to perform needs-based acceleration;
   provisioning a new second VM;
   loading the FPGA that is identified with the needs-based acceleration; and
   migrating from the first VM to the second VM.

32. The method of clause 31, further comprising employing a software orchestrator to perform at least a portion of the method operations.

33. The method of clause 31 or 32, wherein the NFV environment comprises a cloud service environment.

34. The method of any of clauses 31-33, wherein the NVF environment comprises a data center used to host an e-commerce site, and the offending task includes at least one of encryption and decryption operations.

35. The method of any of clauses 31-34, wherein the needs-based acceleration replaces virtual switch or virtual router operations performed by the first VM with hardware-based virtual switch or virtual router acceleration performed by the FPGA that is identified.

36. The method of any of clauses 31-35, wherein the NVF environment includes components defined by the ETSI (European Telecommunications Standards Institute) Network Functions Virtualization (NFV) Architectural Framework.

37. The method of clause 36, wherein the NVF environment includes a plurality of virtual network function components (VNFCs) including an inter-VNF communication infrastructure setup/teardown component and an inter-VNF communication policy component.

38. The method of clause 36, wherein the NVF environment includes a plurality of service level agreement (SLA) components including a first SLA agent operating on NFV infrastructure, a second SLA Agent associated with a virtual network function manager (VNFM), and a third SLA agent associated with a virtualized infrastructure manager (VIM).

39. The method of clause 38, wherein the plurality of SLA components further include an NFV SLA controller that is configured to communicate with each of the first, second and third SLA agents.

40. The method of clause 39, wherein the NFV SLA controller includes an SLA to NFV infrastructure (NFVI) policy translator that is configured to communicate with each of the first, second and third SLA agents.

41. The method of clause 38, wherein the third SLA agent associated with the VIM is configured to manage NFV infrastructure (NFVI) compute and network resources and to direct FPGA-based dynamic acceleration.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including computer-readable or machine-readable non-transitory storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method performed on a compute platform including a host processor, memory, a network interface card (NIC) and a Field Programmable Gate Array (FPGA) Direct Memory Access (DMA) engine, the host processor running a Hypervisor in which a virtual switch is implemented and hosting a plurality of virtual machines (VMs) running a plurality of service applications including service applications comprising virtual network functions (VNFs), the plurality of service applications comprising a service chain, the method comprising:
receiving a packet at the NIC;
processing the packet using a first service application;
examining the packet to determine a next hop along the service chain of service applications from the first service application to a second service application; and
employing the FPGA DMA engine to transfer data associated with the packet along a hardware fast path between a first portion of memory associated with the first service application and second portion of memory associated with the second service application.

2. The method of claim 1, further comprising:
enjoining a descriptor for the packet and its transmit destination for the FPGA DMA engine; and
identifying, using the FPGA DMA engine via the descriptor, a target VM, VNF or virtual network function component (VNFC) corresponding to the next hop.

3. The method of claim 2, further comprising:
retrieving, via the FPGA DMA engine, a receive descriptor from the target VM, VNF, or VNFC; and
moving data pertaining to the packet from the service application to the target VM, VNF, or VNFC.

4. The method of claim 3, further comprising assembling, via the FPGA DMA engine, a source address, target address, and size information relating to movement of the data.

5. The method of claim 3, wherein the FPGA DMA engine performs further operations comprising:
informing the first service application of completion of moving the data; and
informing the target VM, VNF, or VNFC of availability of the data that is moved.

6. The method of claim 3, wherein the packet includes a header, and the method further comprises modifying the packet header via the FPGA DMA engine.

7. The method of claim 1, wherein the CPU is coupled to the FPGA DMA engine via a coherent interconnect.

8. The method of claim 1, wherein the fast path data transfer corresponds to a VNF-to-VNF data transfer.

9. The method of claim 1, wherein the plurality of service applications include software-based virtual network function components (VNFCs), and the fast path data transfer corresponds to a VNFC-to-VNFC data transfer.

10. A compute platform, comprising:
a processor;
memory, operatively coupled to the processor,
a network interface card (NIC), operatively coupled to the processor;
a Field Programmable Gate Array (FPGA) operatively coupled to the processor; and
storage in which software instructions are stored configured to be executed on the processor, the software instructions including instructions corresponding to a Hypervisor in which a virtual switch is implemented, a plurality of machines (VMs), a plurality of service applications including service application comprising virtual network functions (VNFs), the plurality of service applications comprising a service chain,
wherein the compute platform is configured to perform operations implemented via execution of the software instructions and logic programmed in the FPGA including,
processing a packet received at the NIC using a first service application;
examining the packet to determine a next hop along the service chain of service applications from the first service application to a second service application; and
employing the FPGA as a Direct Memory Access (DMA) engine to transfer data associated with the packet along a hardware fast path between a first portion of memory associated with one of a first VM running the first service application and the first service application and second portion of memory associated with one of a second VM running the second service application and the second service application.

11. The compute platform of claim 10, wherein the compute platform is configured to perform further operations, when operating, comprising:
enjoining a descriptor for the packet and its transmit destination for the FPGA DMA engine,
wherein the FPGA is further configured to identify, via the descriptor, a target VM, VNF or virtual network function component (VNFC) corresponding to the next hop.

12. The compute platform of claim 11, wherein the FPGA is further configured to:
retrieve a receive descriptor from the target VM, VNF, or VNFC; and
move data pertaining to the packet from the first service application to the target VM, VNF, or VNFC.

13. The compute platform of claim 12, further comprising:
assembling, via the FPGA DMA engine, a source address, target address, and size information relating to movement of the data.

14. The compute platform of claim 12, wherein the FPGA is configured to, when operating:
inform the first service application of completion of moving the data; and
inform the target VM, VNF, or VNFC of availability of the data that is moved.

15. The compute platform of claim 12, wherein the packet includes a header, and the FPGA is further configured to modify the packet header.

16. The compute platform of claim 10, wherein the processor and the FPGA are part of a package and the processor is coupled to the FPGA via a coherent interconnect.

17. The compute platform of claim 10, wherein the hardware fast path data transfer corresponds to a VNF-to-VNF data transfer.

18. The compute platform of claim 10, wherein the plurality of service applications include software-based virtual network function components (VNFCs), and the hardware fast path data transfer corresponds to a VNFC-to-VNFC data transfer.

19. A method performed in a Network Virtualization Function (NVF) environment comprising a plurality of compute platforms, each compute platform including a host processor, memory, a network interface card (NIC) and a Field Programmable Gate Array (FPGA), the host processor hosting a plurality of virtual machines (VMs) running a plurality of service applications including service applications comprising virtual network functions (VNFs), at least a portion of the FPGAs configured to support one or more needs-based purpose-specific hardware acceleration, the method comprising:
   detecting an overload condition for a VNF or VM on a first compute platform of the plurality of compute platforms;
   identifying an offending task causing the overload condition; and
   dynamically offloading the offending task to an FPGA configured to perform the offending task, wherein the FPGA configured to perform the offending task is one of the FPGAs in the portion of FPGAs configured to support one or more needs-based purpose-specific hardware acceleration and is on either the first compute platform or another compute platform among the plurality of compute platforms.

20. The method of claim 19 further comprising:
   selecting a needs-bases acceleration based on the offending task; and
   securely loading the FPGA with the selected needs-based acceleration.

21. The method of claim 20, wherein the needs-based acceleration is used to perform cryptography operations.

22. The method of claim 19, further comprising:
   setting host processor usage limits for at least a portion of the VMs on the compute platforms;
   monitoring host processor usage for the VMs for which host processor usage limits are set;
   detecting that a VM has exceeded its host processor usage limit;
   determining an amount and type of available hardware-acceleration resources within the NVF environment; and
   dynamically assigning an available hardware-acceleration resource to offload a portion of workload for the VM from its host processor to the hardware-acceleration resource.

23. A method performed in a Network Virtualization Function (NVF) environment comprising a plurality of compute platforms, each compute platform including a host processor, memory, a network interface card (NIC) and a Field Programmable Gate Array (FPGA), the host processor hosting a plurality of virtual machines (VMs) executing a plurality of service applications including service applications comprising virtual network functions (VNFs), at least a portion of the FPGAs configured to support one or more needs-based purpose-specific hardware acceleration, the method comprising:
   performing a plurality of tasks associated with a workload via execution of at least a portion of the plurality of service applications;
   detecting an overload condition for a first VM;
   identifying an offending task causing the overload condition;
   identifying an FPGA to perform needs-based acceleration associated with the offending task;
   provisioning a new second VM;
   loading the FPGA that is identified with the needs-based acceleration;
   migrating execution of a service application associated with the offending task from the first VM to the second VM; and
   offloading a portion of work performed by the service application using the FGPA to perform the needs-based acceleration,
   wherein the first VM is hosted on a processor on a first compute platform among the plurality of compute platforms, and wherein the second VM and the FPGA to perform the needs-based acceleration are either on the first compute platform or on a second compute platform among the plurality of compute platforms.

24. The method of claim 23, further comprising employing a software orchestrator to perform at least a portion of the method operations.

25. The method of claim 23, wherein the NFV environment comprises a cloud service environment.

* * * * *